United States Patent
Weisz (10) Patent No.: US 7,895,993 B2
(45) Date of Patent: Mar. 1, 2011

(54) INTERNAL COMBUSTION ENGINE HAVING EXHAUST GAS RECIRCULATION

(75) Inventor: Rafael Weisz, Waiblingen (DE)

(73) Assignee: Mahle International GmbH, Stuttgart (DE)

( * ) Notice: Subject to any disclaimer, the term of this patent is extended or adjusted under 35 U.S.C. 154(b) by 501 days.

(21) Appl. No.: 11/912,823

(22) PCT Filed: Mar. 11, 2006

(86) PCT No.: PCT/DE2006/000432

§ 371 (c)(1),
(2), (4) Date: Oct. 26, 2007

(87) PCT Pub. No.: WO2006/116958

PCT Pub. Date: Nov. 9, 2006

(65) Prior Publication Data

US 2008/0190404 A1    Aug. 14, 2008

(30) Foreign Application Priority Data

Apr. 29, 2005   (DE) .................. 10 2005 020 482

(51) Int. Cl.
*F02M 25/07*   (2006.01)
*F16K 15/14*   (2006.01)
*F16K 15/16*   (2006.01)
*F16K 15/18*   (2006.01)
*F16K 31/00*   (2006.01)

(52) U.S. Cl. .................. 123/568.26; 137/522; 137/523; 137/527; 137/855; 137/859; 137/543.19; 137/540; 251/129.18; 251/129.16

(58) Field of Classification Search ............ 137/543.19, 137/540, 522, 523, 527, 855, 856, 859; 123/568.26; 251/129.18, 129.16
See application file for complete search history.

(56) References Cited

U.S. PATENT DOCUMENTS 2,906,103 A *  9/1959  Saltzman .................. 62/231
6,439,214 B1   8/2002  Yew (Continued)

FOREIGN PATENT DOCUMENTS

DE          4410487          3/1994

(Continued)

OTHER PUBLICATIONS

English translation provided for EP-1020633.

(Continued)

*Primary Examiner*—Stephen K Cronin
*Assistant Examiner*—Raza Najmuddin
(74) *Attorney, Agent, or Firm*—Rader, Fishman & Grauer PLLC (57) ABSTRACT

The present invention relates to an internal combustion engine (1), in particular for a vehicle, having at least one exhaust gas recirculation line (13) for externally recirculating exhaust gases from an exhaust gas side of the internal combustion engine (1) to a fresh air side of the internal combustion engine (1). To provide a cost-effective and compact design, a combination valve (14) is situated in the exhaust gas recirculation line (13), said combination valve (14) serving to set the quantity of the exhaust has recirculated from the exhaust gas side to the fresh air side and to block a counter-flow from the fresh air side in the direction of the exhaust gas side.

14 Claims, 8 Drawing Sheets

U.S. PATENT DOCUMENTS 6,712,591 B2 * 3/2004 Lee .................... 417/569
2002/0112707 A1 8/2002 Bircann et al.

FOREIGN PATENT DOCUMENTS

| DE | 19520871 | | 6/1995 |
|---|---|---|---|
| DE | 19830230 | | 7/1998 |
| DE | EP1020633 A | * | 7/2000 |
| DE | 10226020 | | 6/2002 |
| EP | 0840000 | | 6/1998 |
| EP | 0928892 | | 7/1999 |
| EP | 1020633 | | 7/2000 |
| EP | 1464823 | | 6/2004 |
| WO | WO-2004/059146 | | 7/2004 |

OTHER PUBLICATIONS

English translation provided for EP-0928892.
English translation provided for DE-19520871.
English translation provided for DE-19830230.
English translation provided for DE-4410487.

* cited by examiner

INTERNAL COMBUSTION ENGINE HAVING EXHAUST GAS RECIRCULATION

This application is a U.S. national phase of International application PCT/DE2006/000432 filed Mar. 11, 2006, which claims priority to German application DE 10 2005 020 482.1 filed Apr. 29, 2005, which are hereby incorporated by reference in their entirety.

The present invention relates to an internal combustion engine, in particular for a vehicle, having at least one exhaust gas recirculation line for external recirculation of exhaust gases from an exhaust gas side of the internal combustion engine to a fresh air side of the internal combustion engine. In addition, the present invention relates to an exhaust gas recirculation valve for installation in such an exhaust gas recirculation line.

The recirculation of exhaust gases is generally known and is essentially used for reducing the nitrogen oxide formation. A differentiation is made between internal exhaust gas recirculation, which results because of overlaps of the opening times of inlet and outlet valves, and external exhaust gas recirculation, which, with the aid of an exhaust gas recirculation line, connects an exhaust system removing exhaust gases from the internal combustion engine to a fresh air system which supplies the internal combustion engine with fresh air.

In a typical exhaust gas recirculation system, an exhaust gas recirculation valve is typically situated in this exhaust gas recirculation line, or EGR line in short, to set a quantity of the exhaust gas recirculated from the exhaust gas side to the fresh air side. This exhaust gas recirculation valve, or EGR valve in short, is thus designed to set the exhaust gas recirculation quantity or exhaust gas recirculation rate. The EGR valve controls the EGR quantity or EGR rate as a function of operating parameters of the internal combustion engine.

In an internal combustion engine having internal combustion, pressure pulsations occur both on the fresh air side and also on the exhaust gas side, which are to be attributed to charge cycle procedures. Pressure pulsations of this type also occur if the internal combustion engine is equipped with a supercharger, in particular with an exhaust gas turbocharger or with a compressor. Because of these pulsations, which are essentially determined by the current operating state of the internal combustion engine, situations may at least temporarily occur in which a higher pressure exists on the fresh air side than on the exhaust gas side. In order that the fresh air does not reach the exhaust gas side via the exhaust gas recirculation line in the event of pressure conditions of this type, a non-return valve, which blocks toward the exhaust gas side, is situated in the exhaust gas recirculation line in addition to the EGR valve in typical exhaust gas recirculation systems. In this way, an undesired pressure drop on the fresh air side may be avoided.

A typical exhaust gas recirculation system has a comparatively complex design because an EGR valve and a non-return valve are installed in the exhaust gas recirculation line.

Furthermore, the EGR valve and the non-return valve together require a comparatively large installation space, which is known to be limited in modern internal combustion engines.

The present invention concerns itself with the problem of specifying an improved embodiment for an internal combustion engine and/or for an EGR valve, which particularly allows an exhaust gas recirculation system to be designed comparatively cost-effectively and compactly.

This problem is solved according to the present invention by the subjects of the independent claims. Advantageous embodiments are the subject matter of the dependent claims.

The present invention is based on the general idea of integrating the quantity setting function of a typical EGR valve and the non-return function of a typical non-return valve in a single valve, which is also referred to in the following as a multipurpose valve. Due to the integration of the cited functionalities in the EGR valve or multipurpose valve according to the present invention, at least the required mounting effort for installing the functionalities in the exhaust gas recirculation line is reduced, because now only one single valve still has to be installed in the exhaust gas recirculation line. Furthermore, price advantages result for the production of a single multipurpose valve in relation to the typical production of two separate valves. In addition, the multipurpose valve according to the present invention automatically has a significantly more compact construction than two separate typical valves.

Further important features and advantages of the present invention result from the subclaims, the drawings, and the associated description of the figure on the basis of the drawings.

It is obvious that the features cited above and still to be explained in the following are usable not only in the particular specified combination, but rather also in other combinations or alone without leaving the scope of the present invention.

Preferred exemplary embodiments of the present invention are illustrated in the drawings and are explained in greater detail in the following description, identical reference signs relating to identical or similar or functionally identical components.

FIG. 1 schematically shows a greatly simplified schematic illustration of an internal combustion engine according to the present invention, FIG. 2 schematically shows a longitudinal section through an EGR valve according to the present invention, FIG. 3 schematically shows a perspective view of a part of the EGR valve from FIG. 2, FIG. 4 schematically shows a longitudinal section through an EGR valve as in FIG. 2, but in another embodiment, FIG. 5 schematically shows a perspective view of a valve member of the embodiment from FIG. 4, FIG. 6 schematically shows a longitudinal section through an EGR valve as in FIG. 4, but in another embodiment, FIG. 7 schematically shows a perspective and partially cutaway view of an EGR valve, but in a further embodiment, FIG. 8 schematically shows a longitudinal section of the EGR valve from FIG. 7, in a maximally open position of a valve member, FIG. 9 schematically shows a longitudinal section as in FIG. 8, but with its valve member adjusted into its closed position, FIG. 10 schematically shows a longitudinal section as in FIG. 2, but in another embodiment, FIG. 11 schematically shows a longitudinal section as in FIG. 10, but in a further embodiment.

Figure 1:
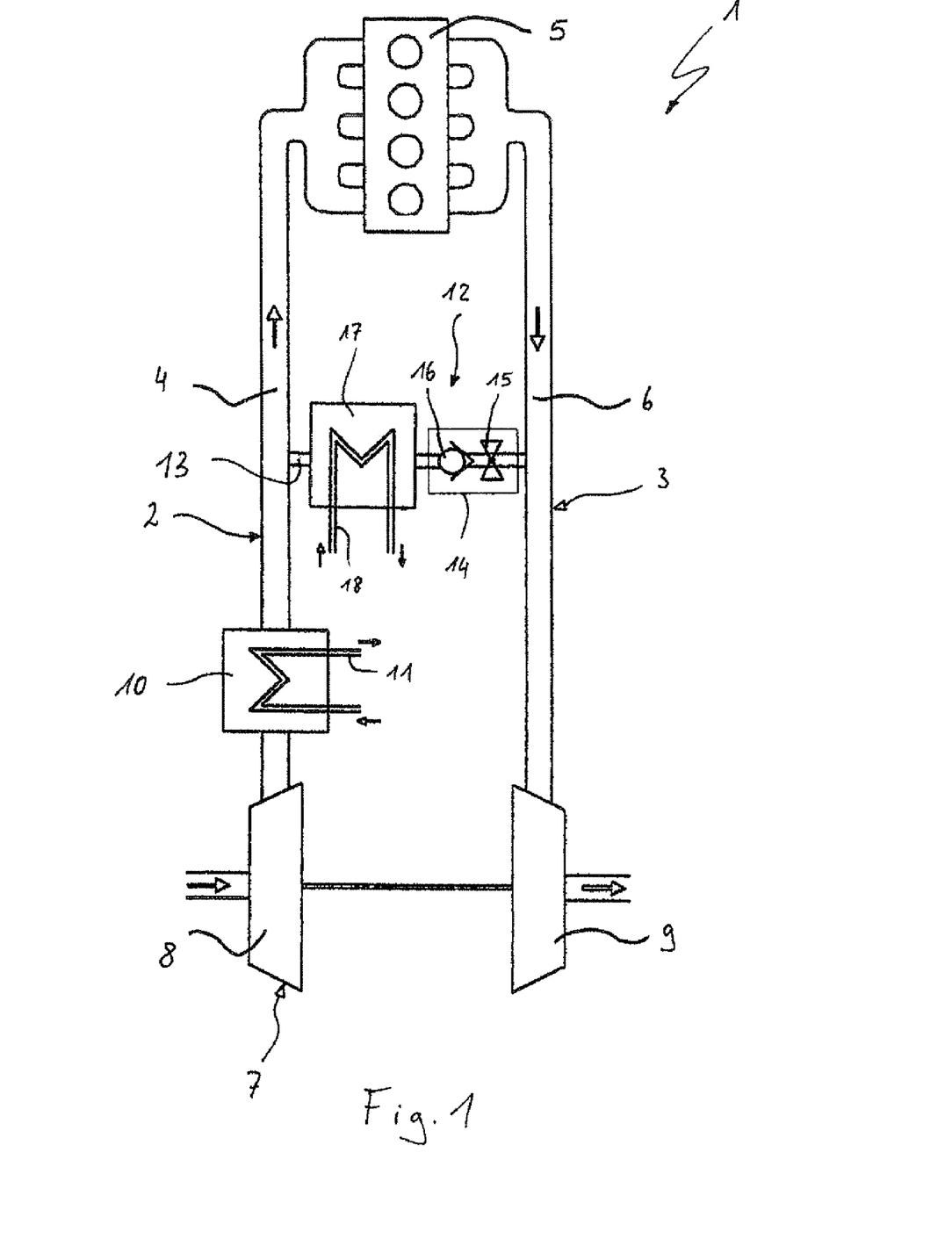

According to FIG. 1, an internal combustion engine 1 according to the present invention comprises a fresh air system 2, through which the internal combustion engine 1 is supplied with fresh air, as well as an exhaust gas system 3, which conducts the combustion exhaust gases away from the internal combustion engine 1. The fresh air system 2 has a fresh air line 4 for this purpose, which leads to an engine block 5 of the internal combustion engine 1, which has the individual combustion chambers of the internal combustion engine 1. In a corresponding way, the exhaust gas system 3 has an exhaust gas line 6, which leads away from the engine block 5.

In the exemplary embodiment shown, the internal combustion engine 1 is supercharged, i.e., the fresh air is brought to an increased pressure level in the fresh air system 2 with the aid of a supercharger 7. In the present exemplary embodiment, the supercharger 7 is implemented as an exhaust gas turbocharger, which comprises a compressor 8 situated in the fresh air line 4 and a turbine 9 situated in the exhaust gas line 6. In principle, another supercharger 7, such as a mechanically operating compressor, may also be provided.

A charge air cooler 10, which is connected to a corresponding cooling loop 11, is typically situated in the fresh air line 4 downstream from the compressor 8.

The internal combustion engine 1 is additionally equipped with an exhaust gas recirculation system 12, which has at least one exhaust gas recirculation line 13, which connects the exhaust gas line 6 to the fresh air line 4. According to the present invention, a novel exhaust gas recirculation valve 14, or EGR valve 14 in short, is situated in this exhaust gas recirculation line 13, or EGR line 13 in short, which is also referred to in the following as a multipurpose valve 14. The EGR valve 14 is designed according to the present invention in such a way that both a quantity setting function, which is visualized in FIG. 1 by a valve symbol 15, and also a non-return function, which is visualized in FIG. 1 by a non-return valve symbol 16, are implemented. This multipurpose valve 14 is thus used both for setting a quantity of the exhaust gas recirculated from the exhaust gas side, i.e., from the exhaust gas line 6, to the fresh air side, i.e., to the fresh air line 4, and also for blocking a counterflow, which is oriented from the fresh air side toward the exhaust gas side. Such a combined EGR valve 14 has a comparatively compact construction, and in any case requires less installation space than a separate non-return valve and a separate setting valve. Furthermore, a multipurpose valve 14 of this type may be produced more cost-effectively due to its increased degree of integration than two separate valves, which are each specialized for one of the cited functions 15, 16.

In the embodiment shown here, an exhaust gas cooler 17 is additionally situated in the exhaust gas recirculation line 13, which is connected to a cooling loop 18 and is used for the purpose of cooling the recirculated exhaust gas if needed to increase the mass flow.

The special EGR valve 14 introduced in FIG. 1 may fundamentally be built up in arbitrary, suitable ways to implement the cited functions 15, 16 in integrated form. In the following, preferred embodiments of an EGR valve 14 of this type are explained in greater detail with reference to FIGS. 2 through 11, but without restricting the generality.

Figure 2:
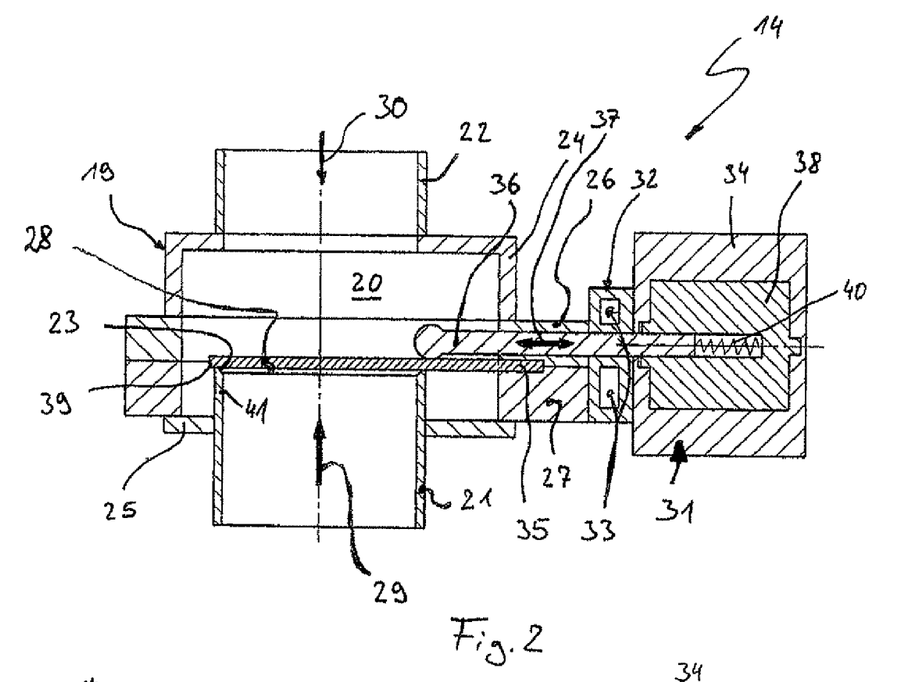
Figure 3:
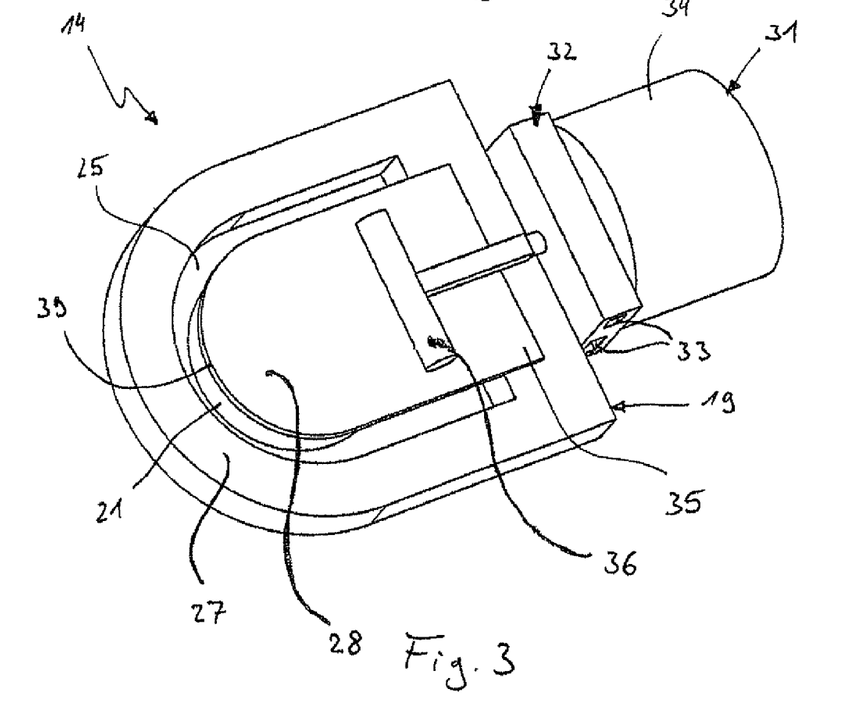

According to FIGS. 2 and 3, the EGR valve 14 according to the present invention comprises a housing 19, which encloses an inner chamber 20, an inlet connection 21 and an outlet connection 22. The inlet connection 21 is implemented as a connecting piece and projects into the inner chamber 20 and has an inlet opening 23 there.

In the example here, the housing 19 comprises a top part 24, a bottom part 25, an upper middle part 26, and a lower middle part 27, the terms "top" and "bottom" solely relating to the illustration in FIG. 2 and not to be related in any way to the particular installation situation, for the case in which the EGR valve 14 is installed in the EGR line 13. The top part 24 having outlet connection 22 attached thereto and the upper middle part 26 are left out in FIG. 3 for better illustration.

In addition, the EGR valve 14 has a valve member 28, which is designed according to the present invention in such a way that it is used both for setting the exhaust gas recirculation quantity and also for blocking a counterflow. An exhaust gas flow to be set in regard to its quantity is symbolized by an arrow 29, while a counterflow to be blocked is symbolized by an arrow 30. Accordingly, the inlet connection 21 is provided for connecting the EGR valve 14 to the exhaust gas side of the internal combustion engine 1, while the outlet connection 22 is provided for the connection to the fresh air side of the internal combustion engine 1.

The valve member 28 is situated in the housing 19 so it is adjustable in relation to the inlet opening 23 and works together with this inlet opening 23, in such a way that the valve member 28 controls the inlet opening 23 as a function of its relative position to the inlet opening 23.

FIG. 2 shows a closed position of the valve member 28, in which the inlet opening 23 is closed by the valve member 28. To implement the non-return function, the valve member 28 is driven or drivable into this closed position using restoring forces. These restoring forces may be implemented in manifold ways, which will be explained in greater detail below. To implement the quantity setting function, the EGR valve 14 additionally comprises a final control element 31, which works together with the valve member 28 to set the particular EGR quantity.

Furthermore, the EGR valve 14 may have a cooling block 32, which contains cooling channels, which may be connected to a cooling loop (not shown in greater detail). The final control element 31 may be thermally separated from the housing 19 with the aid of the cooling block 32. For this purpose, in the embodiment shown here, the cooling block 32 is situated between the housing 19 and a housing 34 of the final control element 31.

In the special embodiment shown in FIGS. 2 and 3, the final control element 31 is designed in such a way that the restoring forces which drive the valve member 28 into the closed position may vary to thus set the particular EGR quantity. The restoring forces are possibly counteracted by an exhaust-side overpressure, which correspondingly drives the valve member 28 to lift off of the inlet opening 23. The lifting of the valve member 28 off of the inlet opening 23 and thus the cross-section which may have flow through it at the inlet opening 23 may therefore be controlled by variation of the restoring forces.

It is fundamentally possible to at least partially generate the restoring forces with the aid of at least one spring element, which works together in a corresponding way with the valve member 28. The final control element 31 may be designed in such a way that a spring rigidity of the cited spring element may thus be varied, to thus set the restoring forces active on the valve member 28 in a targeted way as a function of the particular desired EGR quantity.

In the embodiment of FIGS. 2 and 3, a spring element of this type is formed by the valve member 28 itself, i.e., the valve member 28 is designed as a spring, as a leaf spring here, and generates the restoring forces itself. The valve member 28 designed as a leaf spring is attached to the housing 19 on one side for this purpose. Correspondingly, a fixed end or clamping end 35 of the valve member 28 is clamped in the housing 19, between the two middle parts 26 and 27 here. The valve member 28 comprises suitable spring-elastic material, in particular spring steel.

To be able to influence the spring rigidity of the valve member 28, the final control element 31 has an actuator 36, which is translationally adjustable here corresponding to a double arrow 37. The final control element 31 comprises an actuating drive 38 for this purpose, which may be designed as a spindle drive or as a solenoid or lifting magnet. The actuator 36 is situated in the embodiment of FIGS. 2 and 3 in such a way that it rests on the valve member 28 on the side facing away from the inlet opening 23. The actuator 36 is adjustable parallel to the longitudinal extension of the valve member 28, i.e., in a direction oriented from the fixed end 35 toward the free end 39 distal therefrom.

The length of the free springy section of the valve member 28 may be changed by positioning the actuator 36. The shorter the spring length, the greater the spring rigidity and thus the greater the restoring forces to be overcome by the exhaust gas flow 29. When the actuator 36 is maximally extended, the freely movable spring length of the valve member 28 is so short that the exhaust gas recirculation is more or less blocked. With maximally retracted actuator 36, it is positioned in the area of the clamped end 35 on the valve member 28, for example, because of which the valve member 28 is freely movable essentially along its entire length and thus has its minimal spring rigidity.

Independently of the particular set spring rigidity, i.e., independently of the particular set EGR quantity, the valve member 28 additionally implements the non-return function. As soon as an overpressure arises on the fresh air side, the restoring forces automatically predominate, so that the valve member 28 automatically assumes its closed position and blocks the inlet opening 23.

Furthermore, the EGR valve 14 may be expediently designed as "failsafe". For this purpose, in the event of a breakdown of the power supply of the actuating drive 38, the actuator 36 is automatically maximally extended, in order to thus maximize the spring rigidity. The closing forces are also maximized, by which an undesired exhaust gas recirculation in the event of breakdown of the final control element 31 may be avoided. For example, a compression spring 40 may be provided for this purpose, which extends the actuator 36 if the actuating drive 38 breaks down.

Figure 4:
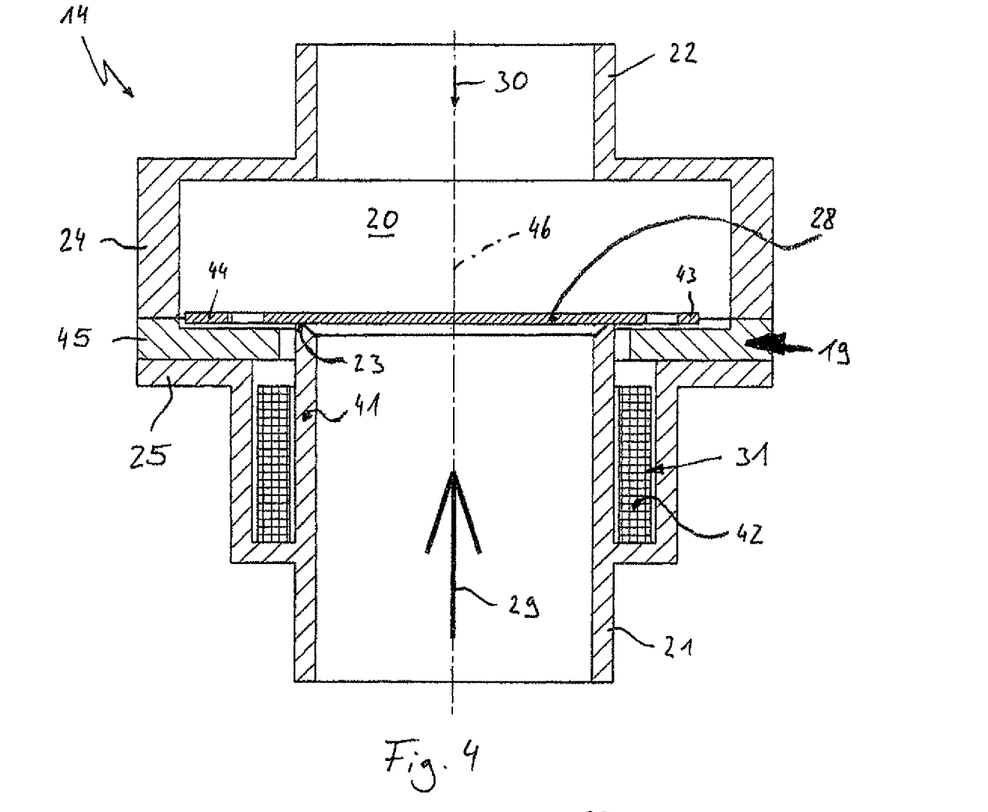

According to FIG. 4, in another embodiment, the restoring forces may at least partially be generated using electromagnetic forces. The final control element 31 is expediently designed in such a way that the electromagnetic forces may be varied therewith, to thus set the particular desired EGR quantity. According to FIG. 4, for example, this is implemented in that an inlet connecting part 41, which has the inlet opening 23 and passes into the inlet connection 21, is designed as ferromagnetic. The final control element 31 is equipped with at least one electromagnetic coil 42, which is implemented as annular and is situated coaxially to the inlet connecting part 41. In addition, the valve member 28 is also designed as ferromagnetic, Inlet connecting part 41 and valve member 28 expediently comprise a soft-magnetic iron for this purpose.

The final control element 31 may generate an electromagnetic field, which introduces the desired closing forces into the valve member 28, via the coil 42. The electromagnetically generated closing forces may be set relatively exactly by the powering of the coil 42. In the event of maximal powering of the coil 42, the closing forces on the valve member 28 are maximal, by which the exhaust gas recirculation is more or less blocked. In the event of minimal powering or "unpowered" coil 42, the electromagnetic restoring forces are minimized or canceled out. Nonetheless, in all settings of the final control element 31, the non-return function of the EGR valve 14 is active, because as soon as an overpressure arises on the fresh air side, the valve member 28 is driven against the inlet opening 23. The valve member 28 is expediently designed as a plate or disk here.

To additionally amplify the restoring forces or to be able to introduce restoring forces into the valve member 28 even with a lack of electromagnetic forces, at least one spring element may additionally be provided. In the embodiment shown in FIG. 4, multiple such spring elements are implemented integrally on the valve member 28. Corresponding to FIG. 5, the valve member 28 has at least one, in this case three spring arms 43 on its edge, via which the valve member 28 is suitably supported on the housing 19. For example, end sections 44 of the spring arms 43 are solidly clamped in the housing 19 for this purpose, for example, between the top part 24 and a middle part 45, which is in turn situated between the top part 24 and the bottom part 25.

Figure 5:
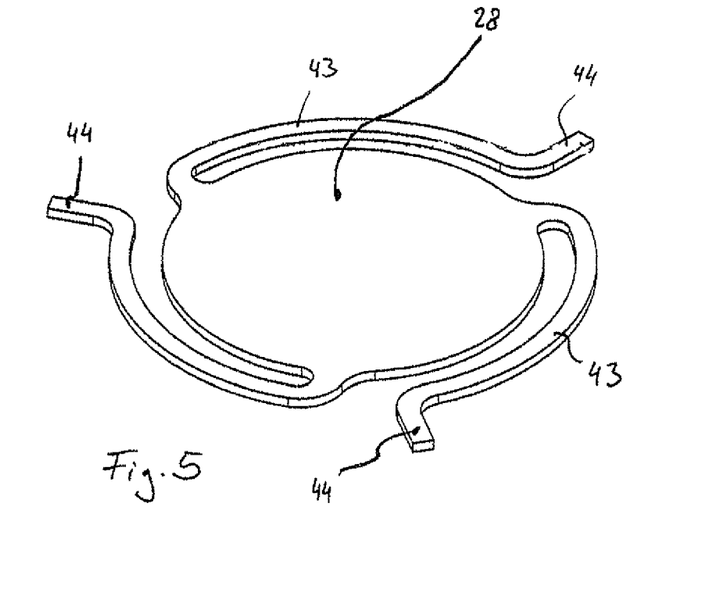

The spring arms 43 each extend here in a plane in which the flat valve member 28 also extends. This plane runs essentially perpendicularly to the movement direction of the valve member 28. The spring arms 43 are additionally shaped as ring segments here, which extend concentrically to a longitudinal central axis 46 of the housing 19. The spring length of the spring arms 43 is comparatively large in this way, while the installation space for positioning and housing the spring arms 43 in the housing 19 simultaneously remains comparatively small.

Figure 6:
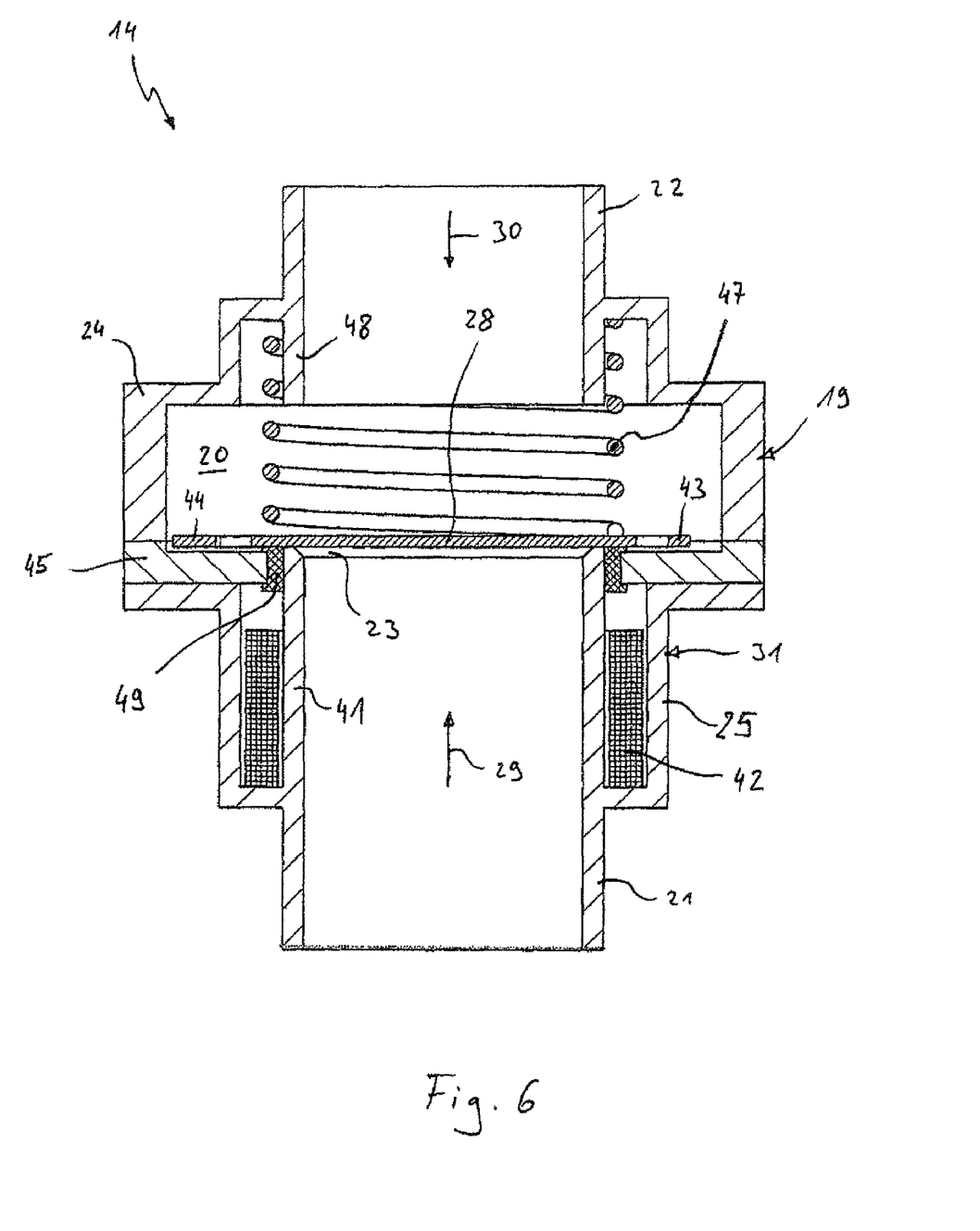

According to FIG. 6, additionally or alternatively to the spring arms 43 of the valve member 28, another spring element, e.g., in the form of a coiled compression spring 47, may be provided, with the aid of which at least a part of the restoring forces may be applied to the valve member 28. For this purpose, this coiled compression spring 47 is supported on one end directly on the valve member 28 and on the other end on the housing 19. The top part 24 has an outlet connecting part 48 in the embodiment shown in FIG. 6, which is radially enclosed externally by the coiled compression spring 47, to guide and position the coiled compression spring 47.

According to FIG. 6, at least one damper 49 may additionally be provided in the area of the inlet opening 23, which is designed in such a way that the impact of the valve member 28 upon entering the closed position is thus damped. For example, the damper 49 comprises a suitable elastic damper material which projects axially beyond the free end of the inlet connecting part 41 defining the inlet opening 23 when the valve member 28 is lifted off of the inlet opening 23 and comes into contact with the valve member 28 when it travels into the closed position. In this way, undesired noise development may be avoided, The damper 49 is expediently designed as annular and encloses the inlet connecting part 41 in the area of the inlet opening 23.

Figure 7:
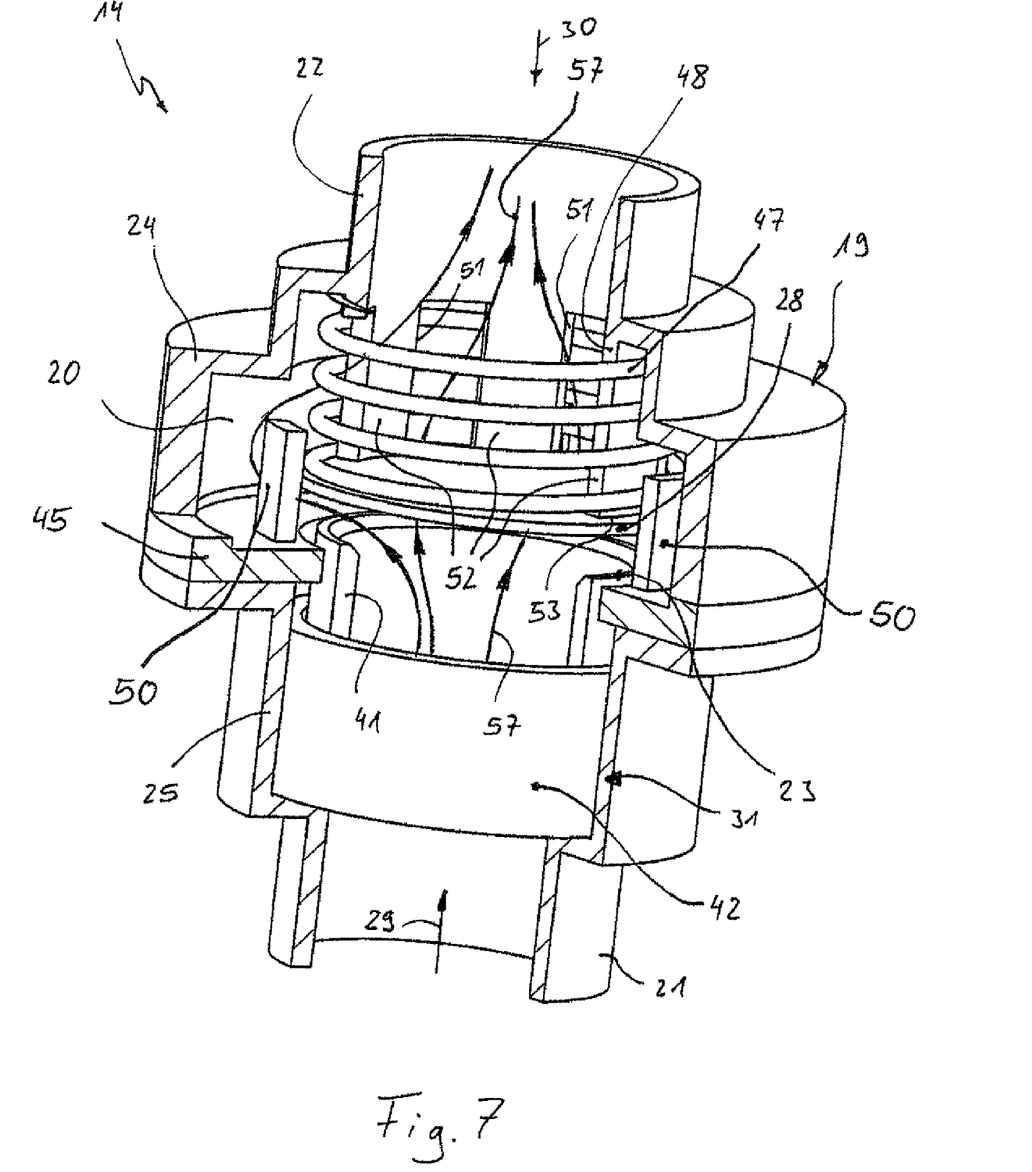
Figure 8:
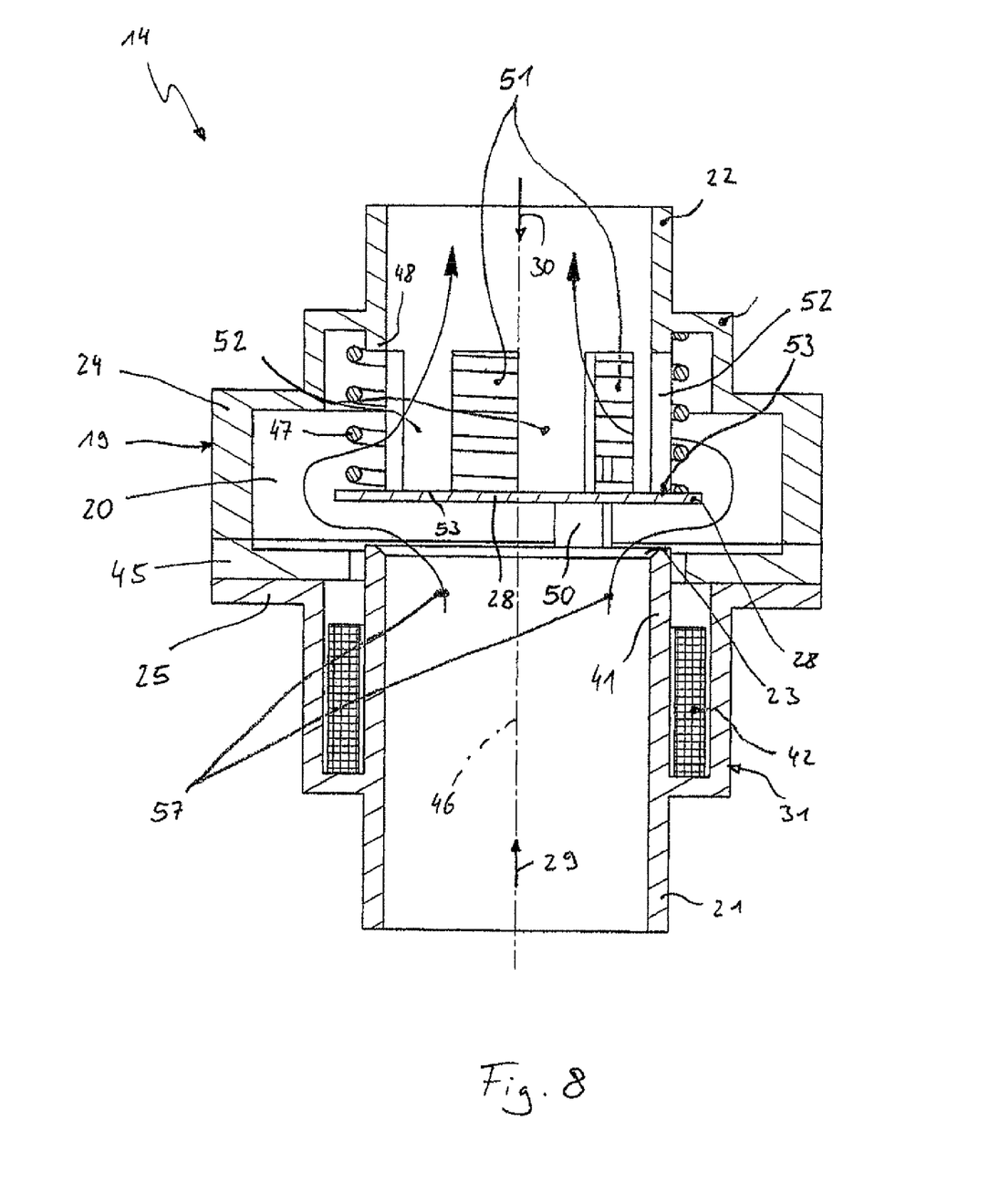
Figure 9:
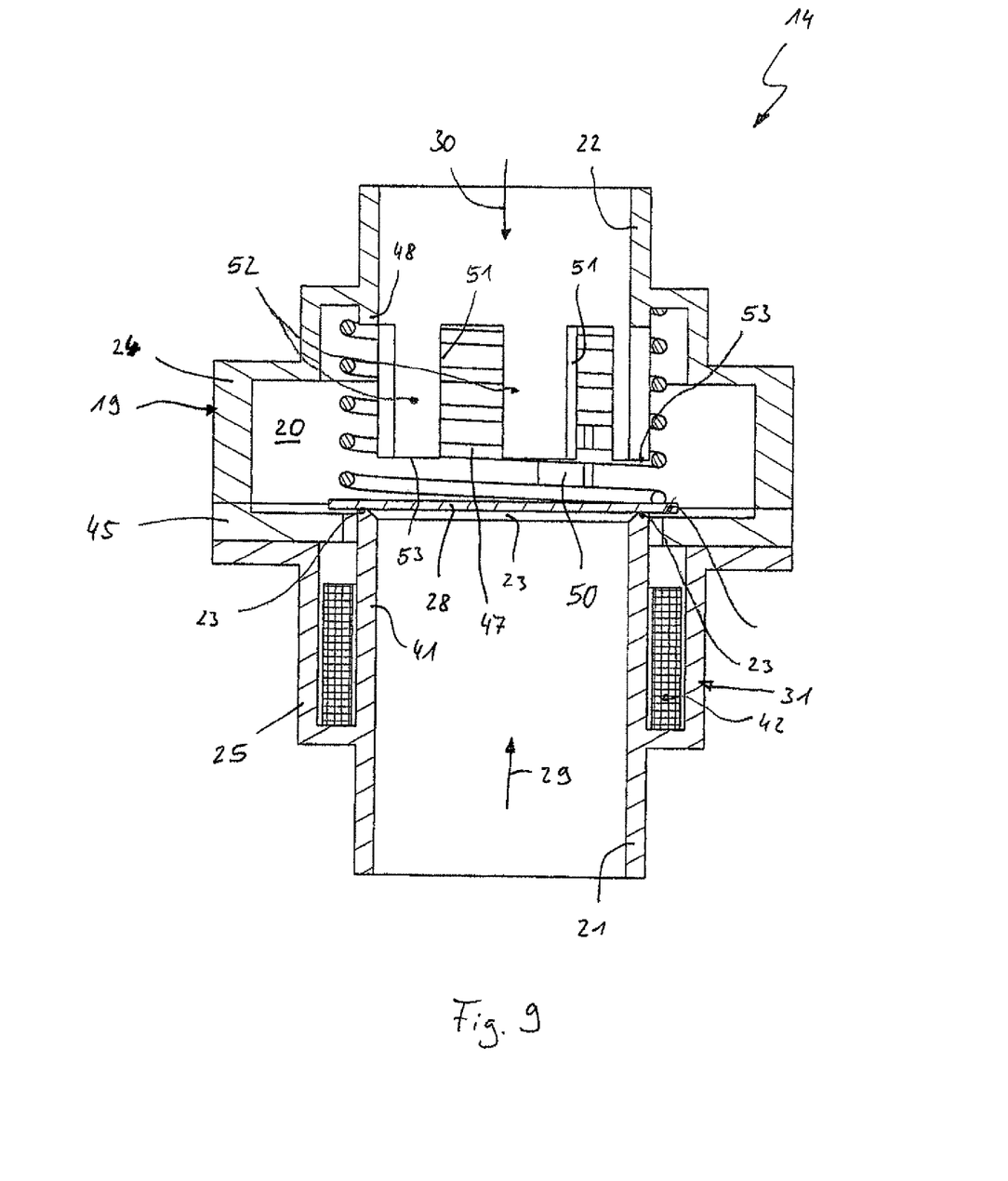

In the embodiment shown in FIGS. 7 through 9, the valve member 28 is again designed as plate-shaped or disk-shaped, but in contrast to the other embodiment, it has no direct connection to the housing 19. The valve member 28 is thus retained quasi-freely movable in the housing 19. To implement a defined adjustment movement for the valve member 28, at least three guide elements 50 are provided in the housing 19, which are situated concentrically and which are positioned around the circumference of the valve member 28. In this way, the valve member 28 is laterally enclosed by the guide elements 50. The guide elements 50 extend parallel to the movement direction of the valve member 28 and thus cause a guide in this movement direction and prevent deviation of the valve member 28 transversely to its movement direction.

In the embodiment shown in FIGS. 7 through 9, the outlet connecting part 48 is equipped with openings or windows 51 which are situated distributed around the circumference. Webs 52 are implemented between the windows 51, which on one hand center and guide the coiled compression spring 47 and on the other hand define a stroke stop 53 for the valve member 28 on their axial free ends. FIGS. 7 and 8 show the valve member 28 in a maximally open position, which is characterized in that the valve member 28 presses against the stroke stop 53, i.e., the free ends of the webs 52.

In contrast thereto, FIG. 9 shows the closed position of the valve member 28, in which the coiled compression spring 47 presses the valve member 28 against the free end of the inlet connecting part 41, by which the valve member 28 blocks the inlet opening 23.

In this embodiment, the final control element 31 also operates using electromagnetic forces to thus vary the closing force. Simultaneously, the non-return function also operates independently of the particular set EGR quantity here.

The embodiment of FIGS. 7 through 9 is distinguished by an especially favorable opening characteristic, which already implements a comparatively large opening cross-section at a comparatively small opening stroke of the valve member 28. The flow through the EGR valve 14 thus resulting is symbolized in FIGS. 7 and 8 by arrows 57.

Figure 10:
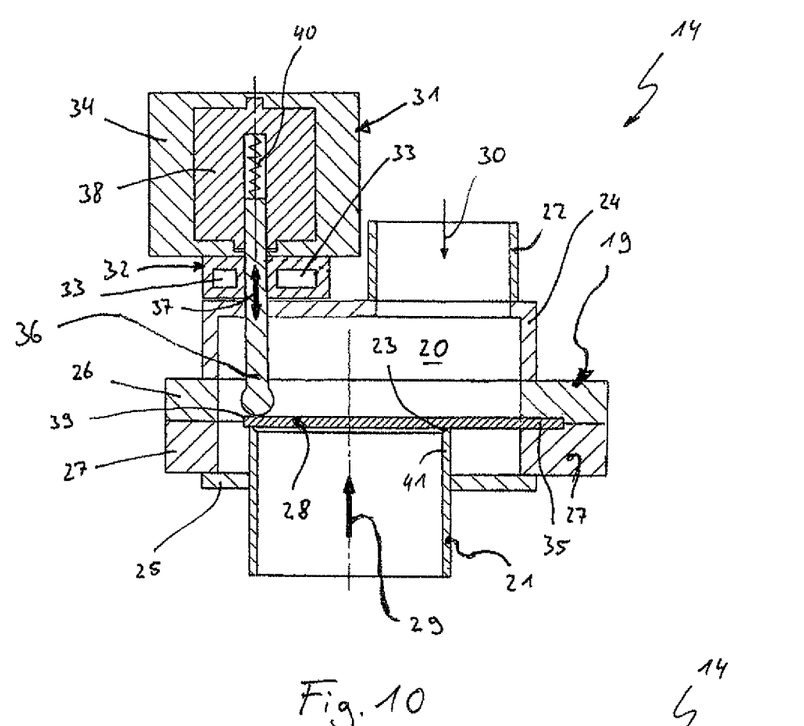
Figure 11:
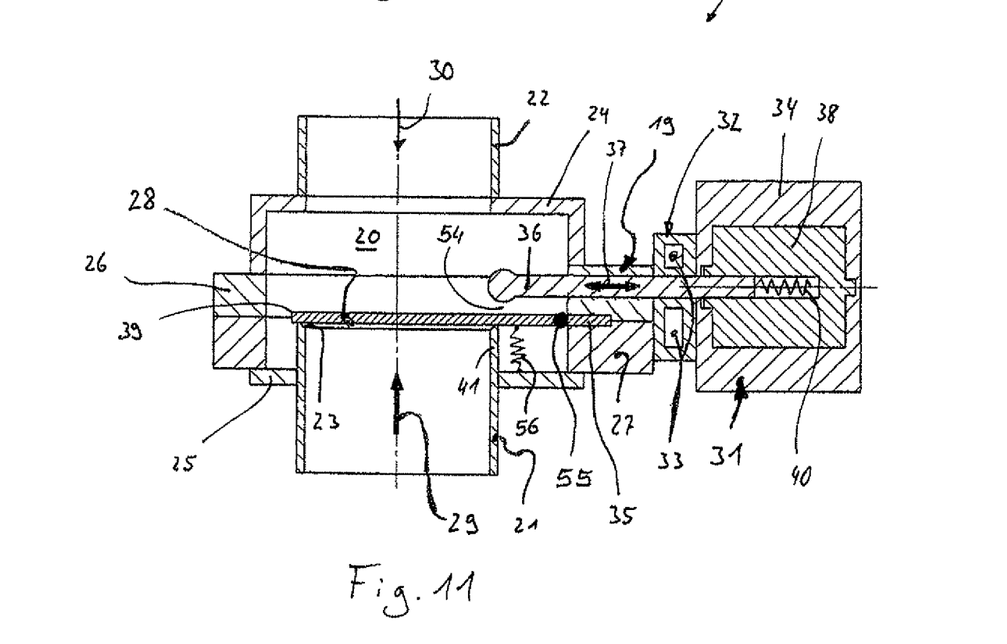

In the embodiment of FIGS. 10 and 11, the final control element 31 is constructed essentially identically as in the embodiment of FIGS. 2 and 3. However, the final control element 31 is not used in the variants of FIGS. 10 and 11 to change the spring rigidity of a closing compression spring, in particular of the valve member 28 designed as a spring. Rather, in the embodiment of FIGS. 10 and 11, the final control element 31 is designed in such a way that an actuator travel which is available for adjusting the valve member 28 in relation to the inlet opening 23 may thus be varied.

In the embodiment of FIG. 10, the final control element 31 is attached in such a way that the actuator 36 may be positioned parallel to the adjustment movement of the valve member 28. In the position shown of the actuator 36, the actuator 36 is already in contact with the valve member 28 in its closed position. I.e., in this position of the actuator 36, the valve member 28 may not open; the actuator travel of the valve member 28 is thus reduced to the value zero. The actuator travel which the valve member 28 may pass through may be increased by inward travel of the actuator 36. The valve member may then move away from the inlet opening 23 against the restoring forces, here against the spring force of the valve member 28, within the actuator travel as a function of the exhaust-side overpressure. The EGR quantity may be set in this way by varying the actuator travel.

In the embodiment shown in FIG. 11, the final control element 31 is situated fundamentally similarly as in the embodiment in FIG. 2. An essential difference, however, is that there is a distance in its movement direction between the valve member 28 and the actuator 36 in the closed position of the valve member 28. This distance is identified in FIG. 11 by 54. The angle, i.e., the actuator travel which the valve member 28 may open and/or lift off of the inlet opening 23, is significantly influenced by longitudinal adjustment of the actuator 36. Correspondingly, the EGR quantity may also be influenced by varying the actuator travel here. It is clear that the movement direction of the actuator 36 may be selected arbitrarily in principle and may thus deviate in particular from the horizontal orientation shown in FIG. 11 and the vertical orientation shown in FIG. 10.

FIG. 11 shows a further special feature, because the valve member 28 is not designed as a spring element therein, but rather is mounted on the housing so it is pivotable via a bearing or joint 55. A closing spring 56 may optionally be provided for automatic pivoting of the valve member 28 back into the closed position.

As in the other embodiments, the valve member 28 may also block the counterflow 30 independently of the particular set EGR rate in case of overpressure on the fresh air side. This is because the valve member 28 is always freely movable in its closed position.

The invention claimed is:

1. An internal combustion engine, comprising:
    at least one exhaust gas recirculation line configured to provide external recirculation of exhaust gases from an exhaust gas side of the internal combustion engine to a fresh air side of the internal combustion engine, and
    a multipurpose valve, in fluid communication with the exhaust gas recirculation line, the valve configured to allow the exhaust gas recirculated from the exhaust gas side to the fresh air side only when an exhaust gas overpressure exists, the valve also configured to generally prevent a counterflow from the fresh air side to the exhaust gas side, wherein the fresh air side of the valve defines an inlet opening, the valve cooperating with said inlet opening to allow exhaust gas to flow from said exhaust gas side to said fresh air side when the predetermined exhaust gas overpressure exists; and
    a control element configured to cooperate with the valve to determine the predetermined exhaust gas overpressure;
    wherein the valve is responsive to a restoring force urging the valve into a closed position, wherein the valve generally blocks the inlet opening and thereby generally prevents the counterflow when the valve is in the closed position, wherein the control element is configured to adjust a magnitude of the restoring force; and
    wherein the control element is configured to vary a rigidity of a spring element to determine the predetermined exhaust gas overpressure.

2. An exhaust gas recirculation valve, comprising:
    an inlet connection configured to be in fluid communication with an exhaust gas flow of an internal combustion engine;
    an outlet connection configured to be in fluid communication with a fresh air flow of the internal combustion engine;
    a valve member in fluid communication with the inlet connection and the outlet connection, the valve member configured to generally allow exhaust gas received at the inlet connection to flow to the outlet connection only when an exhaust gas overpressure exists, the valve member also configured to generally prevent a counterflow from the outlet connection to the inlet connection, wherein the inlet connection defines an inlet opening, the valve member cooperating with said inlet opening to allow exhaust gas to flow from said inlet connection to said outlet connection when the predetermined exhaust gas overpressure exists; and
    a control element configured to cooperate with the valve member to determine the predetermined exhaust gas overpressure;
    wherein the valve member is responsive to a restoring force urging the valve member into a closed position, wherein the valve member generally blocks the inlet opening and thereby generally prevents the counterflow when the valve member is in the closed position, wherein the control element is configured to adjust a magnitude of the restoring force; and
    wherein the control element is configured to vary a rigidity of a spring element to determine the predetermined exhaust gas overpressure.

3. The exhaust gas recirculation valve of claim 2, wherein the valve member includes a spring arm extending along a plane to engage a housing of the exhaust gas recirculation valve, the plane being generally perpendicular to a movement direction of the valve member.

4. The exhaust gas recirculation valve of claim 2, wherein the valve member is generally laterally enclosed and coaxially guided along a movement direction by at least three guide elements.

5. The exhaust gas recirculation valve of claim 2, further comprising a damper configured to generally dampen the valve member against the inlet opening when the valve member is in a closed position, the valve member generally blocking the inlet opening when the valve member is in the closed position.

6. The exhaust gas recirculation valve of claim 2, wherein the valve member is adjustable in relation to the inlet opening to vary the predetermined exhaust gas pressure.

7. The exhaust gas recirculation valve of claim 2, wherein the valve member is responsive to a restoring force urging the valve member into a closed position, wherein the valve member generally blocks the inlet opening and thereby generally prevents the counterflow when the valve member is in the closed position.

8. The exhaust gas recirculation valve of claim 7, wherein the restoring force is at least partially generated by a spring element.

9. The exhaust gas recirculation valve of claim 7, wherein the restoring forces are at least partially generated using an electromagnetic force.

10. The exhaust gas recirculation valve of claim 9, further comprising a control element configured to cooperate with the valve member to determine the predetermined exhaust gas overpressure, wherein the control element varies the electromagnetic forces to determine the predetermined exhaust gas overpressure.

11. The exhaust gas recirculation valve of claim 10, wherein the control element includes at least one electromagnetic coil disposed generally coaxially with the inlet connecting part.

12. The exhaust gas recirculation valve of claim 2, wherein the control element is configured to vary a position of an actuator in operational communication with the valve member, thereby determining the predetermined exhaust gas overpressure.

13. The exhaust gas recirculation valve of claim 2, wherein the valve member is the spring element.

14. The exhaust gas recirculation valve of claim 2, wherein the valve member is a leaf spring secured to a housing of the exhaust gas recirculation valve.

* * * * *